Figure 1:
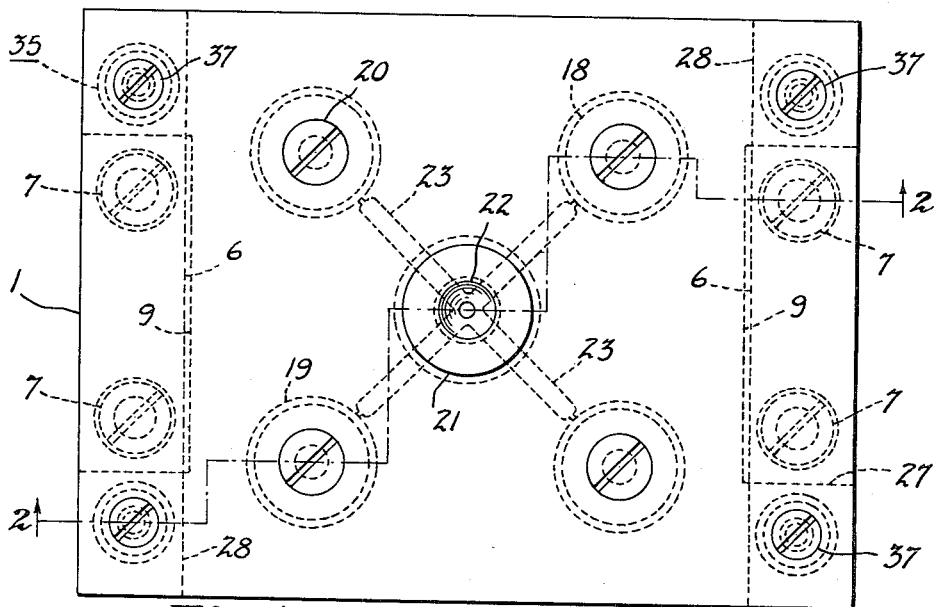

July 17, 1962  A. E. WISKOFF ET AL  3,044,120

MOLD BASE

Filed Aug. 6, 1959

INVENTORS
*Arthur E. Wiskoff*
*Julius P. Szorady*
BY *McCoy, Greene & LeGrotenhuis*
ATTORNEYS United States Patent Office 3,044,120
Patented July 17, 1962

3,044,120
MOLD BASE
Arthur E. Wiskoff, 9501 Park Heights Ave., Garfield Heights, Ohio, and Julius P. Szorady, 4419 Greenway Ave., South Euclid, Ohio
Filed Aug. 6, 1959, Ser. No. 832,060
2 Claims. (Cl. 18—42)

The present invention relates to a mold base for injection plastic molding and more particularly to a compact versatile mold base which is more efficient and can be made at lower cost.

Heretofore, mold bases for injection molding have been provided with bolts, dowel pins, leader pins, push-back pins, or other fixed obstructions which made it difficult for the die designer to provide a mold which could make the desired articles. It was often necessary for him to have a custom-built mold base made for certain jobs which could not utilize the standard type mold bases due to the obstructions therein. In mold bases of the type shown in U.S. Patents Nos. 2,398,893, 2,419,089 and 2,511,350, for example, a large number of different parts were required. It was necessary to counterbore one ejector plate to receive the heads of the ejector pins and to bore both ejector plates to receive suitable bolts to hold the plates together.

The mold base of the present invention greatly reduces the number of parts needed and provides maximum space for molding cavities, cores, cooling passages, hardened metal inserts, slides, cams, horns, and the like by providing guide bushings which serve as dowels and bolts for the back-up plate and the lower plate, serve to receive the leader pins and return pins, and serve to guide the ejector plate. The return pins also function to connect the clamping plate to the ejector plate so as to hold the ejector pins in place. A head or other suitable means may be provided on each return pin to prevent accidental movement of the ejector pins out of the ejector plate so that the lower portion of the mold base will not come apart during handling after it is disconnected from the machine. Screws may be provided that extend through the ejector and clamping plates into the return pins and that have heads projecting beyond the ejector plate to replace the conventional stop buttons. Such screws may also be provided with shoulders to separate the clamping plate from the ejector plate to eliminate counterbores for the ejector pin heads. The novel construction also simplifies the fastening of the upright parallel side rails to the back-up plate and to the anchor plate or frame of the machine. The result is a mold base which is easy and inexpensive to form, which has a minimum number of parts, and which has the simplicity and versatility desired by the die designer.

An object of the invention is to provide a mold base having a minimum number of fixed holes or obstructions therein which would interfere with the cooling passages, molding cavities, inserts, cams or the like.

A further object of the present invention is to provide a mold base which has a minimum number of parts and can be manufactured at low cost.

Figure 2:
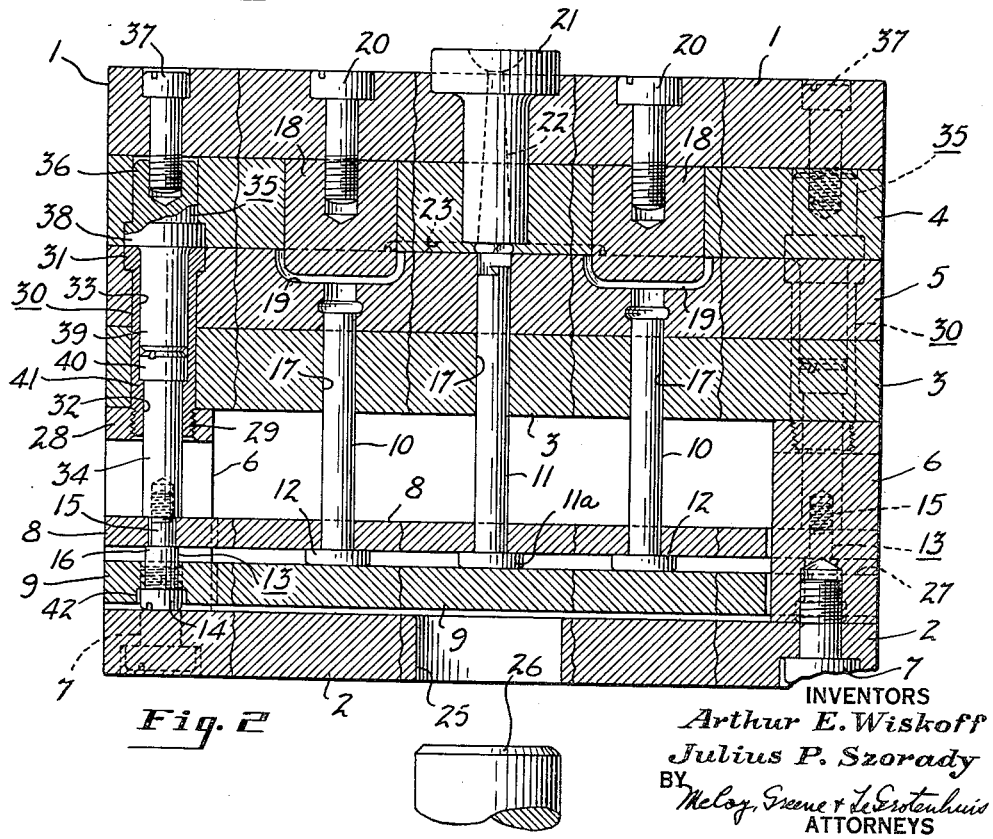

Other objects, uses and advantages of the invention will become apparent to those skilled in the art from the following description and claims and from the drawings, in which:

FIGURE 1 is a top view on a reduced scale showing a mold base constructed according to the present invention; and FIGURE 2 is a vertical sectional view taken substantially on the line indicated at 2—2 in FIG. 1 and on the same scale.

Referring more particularly to the drawings wherein like parts are identified by the same numerals in both views, FIGS. 1 and 2 show a mold base having flat rectangular anchor plates 1 and 2 and a flat rectangular back-up plate 3 located between said anchor plates. Flat rectangular upper and lower mold plates 4 and 5 are located between the plates 1 and 3 and in vertical alignment therewith as indicated in FIG. 2 which is drawn to scale. A pair of upright rectangular side rails 6 are mounted in parallel relation on the anchor plate 2 to support the back-up plate 3 parallel to the mold plates and the anchor plates. The rails 6 can, therefore, be connected indirectly to the movable platen of the molding machine by the anchor plate. It will be understood, however, that in this particular type of mold base, the anchor plate 2 is not needed to hold the parts 3, 6 and 9 together and may be omitted to permit a direct rather than an indirect connection to the molding machine. The reason for this will become apparent from the detailed description below.

A flat clamping plate 8 and a flat ejector plate 9 are mounted between the plates 2 and 3 and parallel thereto for reciprocation in a direction perpendicular to said plates. Four regularly spaced vertical ejector pins 10 and a central vertical sprue puller or pin 11 are mounted on the ejector plate 9 perpendicular to said plate for reciprocation in unison therewith. The sprue puller 11 has an enlarged flat head 11a, and the pins 10 have similar heads 12, said heads fitting between the flat surfaces of the plates 8 and 9 as indicated in FIG. 2 which is drawn to scale. If desired, these heads may be rigidly clamped in place by the plates 8 and 9.

The vertical pins 10 and 11 are cylindrical and are mounted to slide in the vertical cylindrical bores 17 of the plate 3 so as to permit movement of the ejector plate vertically relative to the side members 6 from an uppermost position against the flanges 28 to a lowermost position adjacent the anchor plate 2 as shown in FIG. 2 wherein the stops 14 engage the anchor plate. It will be noted from the drawings that the ejector plate assembly 8, 9 is shaped to fit the side members 6 so as to permit vertical movement of the ejector plate assembly. The rectangular flanges 27 of the ejector plate 9, for example, are located at the four corners of the ejector plate beyond the end faces of the member 6 and below the rectangular flanges 28 of said members which extend outwardly beyond said end faces.

Any suitable mold cavity may be provided in the mold plates 4 and 5 as is well understood in the art. As herein shown the upper plate 4 has four cylindrical bores which receive four cylindrical cores 18, and the lower plate 5 has four mold cavities 19 which receive the lower ends of said cores. The cores 18 are rigidly mounted on the anchor plate 1 by screws 20. A sprue member 21 is rigidly mounted at the center of plate 1 and projects through the mold plate 4, the nozzle 22 of said member communicating with the four radial passages 23 formed in said mold plate and with the Z-shaped upper end 24 of the holding pin 11.

The lower anchor plate 2 has a cylindrical bore 25 of a size to receive the ejection cylinder or stop plunger 26 so as to permit said cylinder to engage the bottom of the ejector plate 9 when the plates 2, 3 and 5 and the rails 6 are moved in unison away from the plates 1 and 4.

The members 2 and 6 are rigidly connected by the screws 7 and the members 3, 5 and 6 are rigidly connected by four bushings 30 having threaded lower ends 29 which fit the internally threaded portions 28 of the members 6. The bushings fit the vertical cylindrical bores of the plates 3 and 5 and have flanges 31, whereby the bushings may be screwed into the rails 6 to clamp the plates 3 and 5 tightly together. Each bushing 30 is provided with a smooth cylindrical bore 32 and a smooth cylindrical counterbore 33 coaxial therewith and perpendicular to the plates 1 to 5. The bore 32 provides a vertical cylindrical guide surface which receives and guides a vertical return pin 34, the smooth cylindrical outer surface of the pin 34 having the same diameter as the bore 32. The bushing 30, therefore, cooperates with the return pin 34 to guide the ejector plate 9 and to maintain this plate parallel to the plates 1 to 5 as it is reciprocated.

Four guide members or leader pins 35 are provided in axial alignment with the bushings 30. Each guide member 35 is rigidly mounted on the upper mold plate 4 at one corner thereof by a screw 37 which screws into the internally threaded upper cylindrical portion 36 of said guide member. The central portions of the guide members are enlarged to provide cylindrical flanges 38 whereby the plates 1 and 4 are clamped tightly together as the screws 37 are tightened. The lower end of each guide member 35 projects downwardly to provide a vertical cylindrical guide portion 39 of the same diameter as the guide surface 33 and axially aligned therewith. Said guide portion is shaped to fit the bushing 30 so as not to interfere with closing movement of the mold plates 4 and 5 and serves to guide the parts together when the mold is closed so that the mold members are accurately aligned. The portion 39 has a smooth cylindrical outer surface of the same diameter as the counterbore 33 and fits in the counterbore to maintain the plates 4 and 5 accurately in alignment when the mold is closed.

The return pins 34 are preferably rigidly connected to the ejector plate 9 to assist in guiding the ejector plate vertically. The mold base of the present invention is also preferably constructed so that the ejector pins 10 and the return pins 34 will not slide out of their bores and permit the assembly to fall apart when the side members 6 are separated from the anchor plate 2 or from the machine as would be the case, for example, in a mold base of the type shown in United States Patent No. 2,419,089. In order to accomplish this, means are provided for limiting movement of the return pins 34 in a direction away from the plates 1, 4 and 5. Such means preferably comprises an enlarged cylindrical head 40 at the end of each return pin 34 having a diameter equal to that of the counter bore 33. The annular shoulder 41 formed between the bore 32 and the counterbore 33 is engageable with the margin of the head as indicated in FIG. 2 to prevent movement of each pin 34 and the plates 8 and 9 away from the backup plate 3. This construction prevents accidental separation of the plates 8 and 9 from the plates 3 and 5 when these parts are handled and before they are mounted on the anchor plate 2. It will be noted that the threaded ends 29 of the bushing 30 hold the side members 6 to prevent such members from falling off during such handling. The mold base of the present invention, therefore, does not require a separate anchor plate 2 and may be handled much differently from mold bases of the type known prior to this invention.

It is preferable to provide screw means at the bottom ends of the return pins 34 to clamp the plates 8 and 9 together so as to eliminate the bolts normally used to hold such parts together (as, for example, in United States Patent No. 2,511,350). Such screw means preferably include screws in addition to the pins 34 rather than threaded extensions on such pins. As herein shown a screw 13 extends vertically through the plates 8 and 9 and is screwed into the internally threaded lower end portion of each return pin 34. The ejector plate 9 is provided with counter bores 42 coaxial with the screws 13 and the return pins 34 to receive the flat heads 14 of the screws.

It is preferable to eliminate the stop buttons and the bores and/or counter bores needed for such stop buttons so as to reduce the cost of manufacture. This may be accomplished by constructing the counterbores 42 and the heads 14 so that the heads project beyond the flat bottom face of the ejector plate and engage the flat upper surface of the anchor plate 2 to serve as stop buttons to limit the movement of the ejector plate.

The counterbores normally used to receive the heads of the ejector pins (as shown, for example, in United States Patents Nos. 2,419,089 and 2,511,350) are preferably eliminated to reduce the cost of machining the clamping plate 8. This is accomplished by using shoulder screws 13 having the threaded end portions 15 reduced in diameter to provide annular shoulders 16 for engaging the flat bottom surface of the clamping plate 8. The shoulder screws 13 and the plates 8 and 9 are constructed as shown in FIG. 2 so that the plates 8 and 9 are spaced apart a distance corresponding to the axial thickness of the heads 11a and 12. It is preferable to provide a tight fit rather than a loose fit and to clamp the pins 10 and 11 rigidly in place. It will be understood, however, that the heads 11a and 12 may be clamped between the plates 8 and 9 by the screws 13 even if the shoulder 16 does not apply substantial pressure against the plate 8.

The connection of the side members 6 to the plates 3 and 5 by the bushings 30 eliminates the need for bolts or screws, such as used in United States Patent No. 2,419,089, extending from the anchor plate to the backup plate. It is only necessary to provide screws 7 or other suitable means to connect the side members 6 to the anchor plate or to the machine. It is, therefore, possible to disconnect the side members 6 from the machine without disconnecting them from the back-up plate. Such removal may, because of the heads 40, also be effected without holding the ejector plate to prevent it from falling away from the back-up plate.

During molding the plates 4 and 5 are held tightly together as indicated in FIG. 2. After the molding operation is completed the anchor plate is retracted away from the anchor plate 1 to separate the mold plates 4 and 5 and to cause the ejector plate 9 to engage the stationary stop member 26. As the retracting movement continues the back-up plate 3 slides on the return pins 34 and on the ejector pins 10 to eject the molded articles from the mold cavities.

When the anchor plate 2 is advanced toward the plate 1 for the next molding operation, the guide portions 39 enter the bushings 30 and engage the return pins 33. The return pins move against the ejector plate 7 to position it as shown in FIG. 2 when the mold is closed.

The bushings 30 perform at least six different functions. They (1) provide dowels to align accurately the plates 3 and 5, (2) provide screw means to clamp the members 3, 5 and 6 together, (3) provide guide means for the members 35 to align the plates 4 and 5, (4) provide holders for the return pins 34, (5) cooperate with the return pins to align and guide the ejector plate 9, and (6) limit axial movement of the return pins and the ejector plate carried thereby away from the back-up plate. The novel arrangement of the present invention minimizes the number of vertical bores in the plates 1, 3, 4, 5, 8 and 9 so as to minimize the cost of manufacture and provide maximum space for cooling passages, molding cavities, etc. This is particularly important in small mold bases but is also very important in larger mold bases.

It will be understood that the plates of the mold base are shown in horizontal positions for purposes of illustration and that they may be mounted in horizontal or vertical positions or in various inclined positions as desired. The anchor plate 2 is shown for convenience but obviously may be omitted to permit a direct connection to the machine.

It will be understood that, in accordance with the provisions of the patent laws, variations and modifications of the specific devices disclosed herein may be made without departing from the spirit of the invention.

Having described our invention, we claim:

1. A mold base comprising a flat anchor plate, an ejector plate parallel to said anchor plate, a pair of parallel side members spaced from said anchor plate and disposed generally perpendicular thereto on opposite sides of said ejector plate, a back-up plate between said anchor plate and said ejector plate and parallel thereto, first and second mold plates between said back-up plate and said anchor plate and parallel thereto, a plurality of ejector pins rigidly mounted on said ejector plate perpendicular to said plates and projecting through said back-up plate, means rigidly connecting said second mold plate and said back up plate to said side members comprising a series of annular bushings having enlarged flanges that fit in said second mold plate and having threaded ends projecting through said back-up plate, means rigidly connecting said first mold plate to said anchor plate comprising a series of internally threaded guide members mounted in said first mold plate and screws extending through said anchor plate into said guide members, said guide members being axially aligned with said bushings and having cylindrical guide portions that slidably fit in said bushings to maintain the mold plates in accurate alignment, a series of cylindrical return pins that slidably fit in said bushings between said ejector plate and said guide portions, said return pins being parallel to said ejector pins and being engageable with said guide members and said ejector plate to limit the movement of the ejector plate toward said first mold plate, and means mounting said ejector plate on said return pins for reciprocation in a direction perpendicular to said plates.

2. A mold base comprising a flat anchor plate, an ejector plate parallel to said anchor plate, a pair of parallel side members spaced from said anchor plate and disposed generally perpendicular thereto on opposite sides of said ejector plate, a back-up plate between said anchor plate and said ejector plate and parallel thereto, first and second mold plates between said back-up plate and said anchor plate and parallel thereto, a plurality of ejector pins rigidly mounted on said ejector plate perpendicular to said plates and projecting through said back-up plate, means rigidly connecting said second mold plate and said back-up plate to said side members comprising a series of annular bushings having enlarged flanges that fit in said second mold plate and having threaded ends projecting through said back-up plate, means rigidly connecting said first mold plate to said anchor plate comprising a series of internally threaded guide members mounted in said first mold plate and screws extending through said anchor plate into said guide members, said guide members being axially aligned with said bushings and having cylindrical guide portions that slidably fit in said bushings to maintain the mold plates in accurate alignment, a series of cylindrical return pins that slidably fit in said bushings between said ejector plate and said guide portions, said return pins being parallel to said ejector pins and being engageable with said guide members and said ejector plate to limit the movement of the ejector plate toward said first mold plate, means mounting said ejector plate on said return pins for reciprocation in a direction perpendicular to said plates, said return pins being connected to the ejector plate, and means for preventing movement of the return pins in the direction of the ejector plate out of said bushings, whereby the ejector pins will not accidentally move out of the back-up plate to release the ejector plate when the assembly is handled, said last-named means comprising an enlarged cylindrical head on each return pin having a diameter equal to that of said guide portions and an annular shoulder in the associated bushing for engaging said head to limit movement thereof.

References Cited in the file of this patent
UNITED STATES PATENTS

| | | |
|---|---|---|
| 2,419,089 | Quarnstrom | Apr. 15, 1947 |
| 2,439,782 | Schmid et al. | Apr. 13, 1948 |
| 2,480,605 | Quarnstrom | Aug. 30, 1949 |
| 2,490,229 | Quarnstrom | Dec. 6, 1949 |
| 2,630,601 | Shiffer et al. | Mar. 10, 1953 |
| 2,874,409 | Quarnstrom | Feb. 24, 1959 |